United States Patent [19]

Kotthaus

[11] Patent Number: 4,514,118

[45] Date of Patent: Apr. 30, 1985

[54] METHOD FOR FABRICATING GEARS

[75] Inventor: Erich Kotthaus, Wallisellen, Switzerland

[73] Assignee: Werkzeugmaschinenfabrik Oerlikon-Bührle AG, Zurich, Switzerland

[21] Appl. No.: 285,054

[22] Filed: Jul. 20, 1981

[30] Foreign Application Priority Data

Aug. 12, 1980 [CH] Switzerland ............ 6092/80

[51] Int. Cl.³ .............................................. B23F 9/14
[52] U.S. Cl. ........................................ 409/26; 409/12
[58] Field of Search .............. 409/25, 26, 29, 30, 409/31, 12

[56] References Cited

U.S. PATENT DOCUMENTS

| 2,510,528 | 6/1950 | Soper | 409/26 |
| 2,766,664 | 10/1956 | Cialle | 409/26 |
| 2,932,239 | 4/1960 | Wildhaber | 409/26 |
| 2,949,062 | 8/1960 | Apitz | 409/26 |

FOREIGN PATENT DOCUMENTS 465008 4/1937 United Kingdom ............ 409/30

Primary Examiner—William R. Briggs
Attorney, Agent, or Firm—Werner W. Kleeman

[57] ABSTRACT

Tooth flanks of a gear are produced with a cutter head rotating about a cutter head axis and equipped with cutters having internal or inner cutting edges and external or outer cutting edges. In order to obtain a further increase in the gear cutting capacity or output, while avoiding the therewith usually associated tooth flank errors, the cutter head axis is pivoted out of a normal within or into a plane, as the case may be. At the cutter head the external cutting edges are arranged at a first circle, the internal cutting edges at a second circle and such respective cutting edges are arranged in offset relationship from a uniform angle division or pitch through a predetermined respective angle. The external cutting edges and the internal cutting edges form with a normal to a tangential plane a respective predetermined angle.

11 Claims, 20 Drawing Figures

METHOD FOR FABRICATING GEARS

BACKGROUND OF THE INVENTION

The present invention relates to a new and improved method of, and cutter head for, producing gears containing lengthwise crowned or cambered gear teeth. The invention further pertains to the use of the method and to gear teeth produced in accordance with the inventive method.

Generally speaking, the invention contemplates cutting the tooth flanks of gear teeth with a cutter head rotating about a cutter head axis and equipped with cutters having inner or internal cutting edges and outer or external cutting edges.

In Swiss Pat. No. 271,703, granted Nov. 15, 1950, there is disclosed a method and apparatus for cutting bevel gears possessing curved teeth, in accordance with a continuous generating method. The crown or camber of the teeth is obtained in that the outer or external cutting blades mutually have the same radial spacing from an axis of rotation of the tool, and the inner or internal cutting blades or cutters mutually possess the same radial spacing from such axis of rotation. This in effect means that the inner flanks of the gear teeth are produced by blades or cutters which possess a larger radial spacing from the axis of rotation than the blades or cutters by means of which there are produced the outer flanks of the gear teeth.

In Swiss Pat. No. 417,284, granted July 15, 1966, and the corresponding U.S. Pat. No. 3,218,931, there is disclosed a method and cutter head pair for the manufacture of lengthwise crowned or cambered teeth of a pair of bevel gears or hypoid gears possessing lengthwise curved gear teeth. The tooth crown is obtained by inclining the cutter head axis in a radial plane through the computation or operating pitch point of the tooth flank, with the same radii of the cutting edges of all of the blades or cutters with respect to the axis of rotation.

In Swiss Pat. No. 594,468, granted Sept. 15, 1977, and the corresponding U.S. Pat. No. 4,183,703, there is disclosed a method of fabricating a pair of spur gears. Here, the gear tooth crown or camber likewise is obtained by inclining the cutter head axis in a radial plane extending through the computation or operating pitch point.

With these prior art techniques for the fabrication of pairs of bevel gears, hypoid gears and spur gears, an increase in the cutting capacity or output is limited by virtue of the required type and quality of the load carrying image or load capacity of the tooth flanks.

Further constructions of gear cutting machines have been disclosed in U.S. Pat. Nos. 2,510,528; 2,881,665 and 2,932,239; and British Pat. No. 962,914.

SUMMARY OF THE INVENTION

Therefore, with the foregoing in mind it is a primary object of the present invention to increase the cutting capacity or output when fabricating such type gears in a manner beyond that which was heretofore possible.

Another and more specific object of the present invention aims at providing a new and improved method of, and cutter head for, producing gears possessing lengthwise crowned or cambered gear teeth, while enabling an appreciable increase in the cutting capacity or output without disadvantageously affecting the running behaviour of the gears.

Yet a further significant object of the present invention is directed to gears produced in accordance with the novel method, especially gears possessing controlled lengthwise crown and reduced twist in relation to that heretofore possible.

Still a further significant object of the present invention is directed to devising a new and improved construction of apparatus for cutting gears with increased efficiency and which apparatus is relatively simple in construction and design, economical to manufacture, extremely reliable in operation, not readily subject to breakdown or malfunction, and requires a minimum of maintenance and servicing.

At least certain of the advantages which can be obtained when practicing the invention may be essentially enumerated as follows: It is possible to influence, when using the inventive method, the tooth twist. In particular, it is accordingly possible to substantially avoid the same. Since such tooth twist can be avoided in this manner, there is afforded the advantage, when practicing the inventive method and using the inventive apparatus, to employ cutter heads which for a given cutter head radius possess a relatively large number of blade or cutter groups. This affords an appreciable advantage in the gear production operation in that there can be beneficially realised a correspondingly increased cutting output.

A further advantage of the invention resides in the positioning of the cutter head and workpiece relative to one another in accordance with the invention such that when fabricating bevel gears, at the inner diameter of which there merges a shaft, there is reduced the danger of cutting the shaft. Furthermore, when practicing the inventive method there is reduced undercutting at pinions having small tooth numbers, i.e. the tooth cross-sectional constriction arising in such instances at the tooth root or base does not occur or at worst only to a slight degree. In particular, when cutting pinions there is important the fact that the inner or internal cutting edges and the outer or external cutting edges are mutually uniformly loaded, since the apex or head paths of the cutters are closer to one another. This results in more uniform wear which, in turn, again means that the more markedly loaded cutting edges need to be less frequently reground.

The inventive method enables particularly also using cutter heads whose cutter groups each only possess a single blade or cutter. This cutter or blade simultaneously carries an internal cutting edge and an external cutting edge. As a result there is realised an appreciable increase in the cutting output or capacity.

With the aid of the inventive method and the inventive cutter head it is possible for the first time to produce in accordance with a continuous cutting method face gear clutches or jaw or dog clutches whose ratio of outer radius to tooth rim width amounts to a value of 3 to 3.5 which is conventional for gears.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
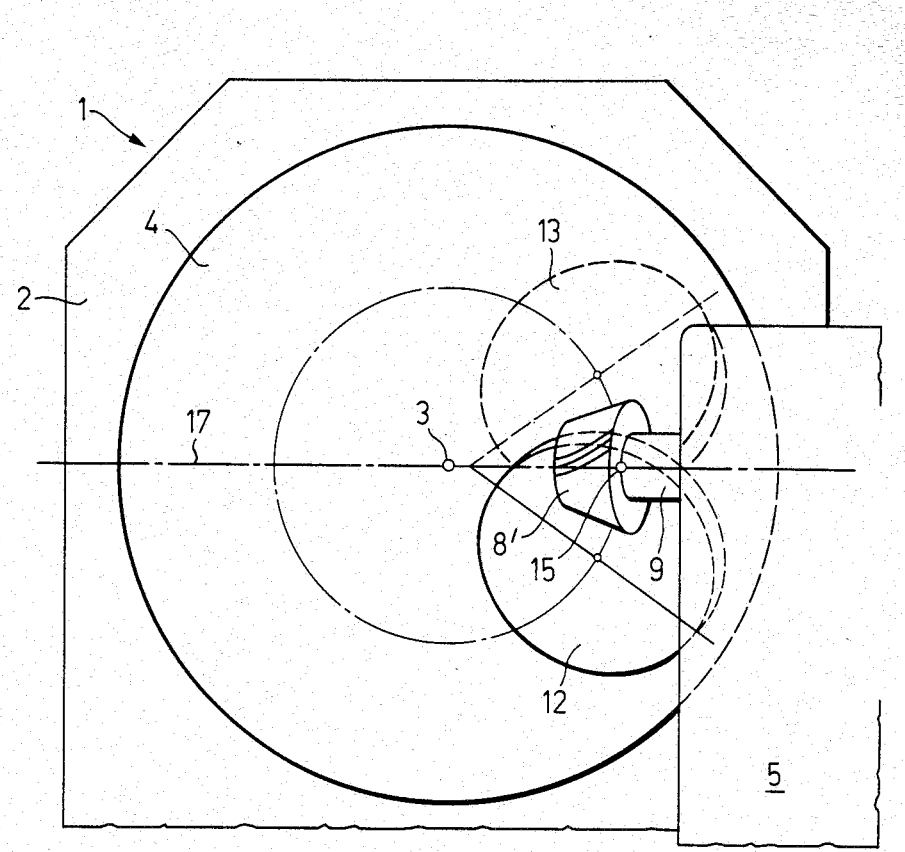
FIG. 1 schematically illustrates a front view of the upper part of a gear cutting machine.
Figure 2:
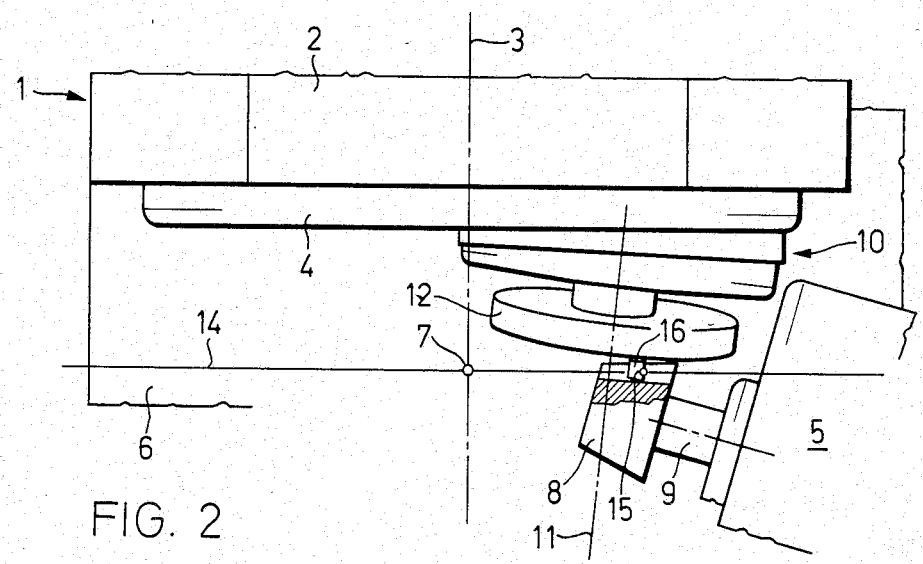
FIG. 2 is a schematic top plan view of the arrangement of FIG. 1, partially shown in sectional view.

Describing now the drawings, FIGS. 1 and 2 schematically illustrate part of a conventional gear cutting machine 1 containing a generating or roll cradle 2 and a generating or roll drum 4 which is rotatably mounted in the roll cradle 2 for rotation about an axis 3. Attached to a spindle 9 at a headstock 5 is a gear blank or workpiece, for instance a bevel gear blank or body 8' which does not yet have any gear teeth cut therein for producing a bevel gear 8. The headstock 5 is pivotably mounted upon a machine bed 6 in conventional manner for pivotal movement about a centre 7. Of course, at such gear cutting machine 1 it is possible to attach other gear blanks or bodies, for instance gear blanks for other bevel gears, spur gears, crown, face or contrate gears and so forth.

FIG. 2 illustrates parts of a pivot mechanism or device which enables inclining the cutter head-spindle axis or a cutter head axis 11 in relation to the generating or roll drum 4. As is already well known in this technology a cutter head 12 is rotatably mounted upon the generating or roll drum 4, and equally the bevel gear blank 8' is rotatably mounted upon the headstock 5. A further cutter head 13 has been shown in phantom lines in FIG. 1. In this position there must be located a cutter head in order to fabricate a not particularly here illustrated mating gear for the bevel gear 8. Furthermore, in FIG. 2 there is illustrated a tangential plane 14 which is placed at the pitch surface of the bevel gear 8. In this tangential plane 14 there is located a computation or operating pitch point 15 for the tooth flanks of the bevel gear 8. The computation or pitch point 15—sometimes referred to in the art as tooth contact point—also will be seen by referring to FIG. 1.

FIG. 2 also illustrates a cutter or blade 16, wherein as a general rule a plurality of such cutters or blades are distributively arranged about the circumference of the cutter head 12. Yet, in order to simplify the illustration and to preserve clarity thereof these additional cutters or blades have not been particularly shown in FIG. 2. FIG. 1 also shows an axis 17 through the computation or pitch point 15 and which also intersects the axis 3. The cutter heads 12 and 13 are symmetrically arranged with respect to this axis 17 for the purpose of cutting a gear and its mating gear, respectively, however not simultaneously, rather successively during cutting of the relevant gear.

Figure 3:
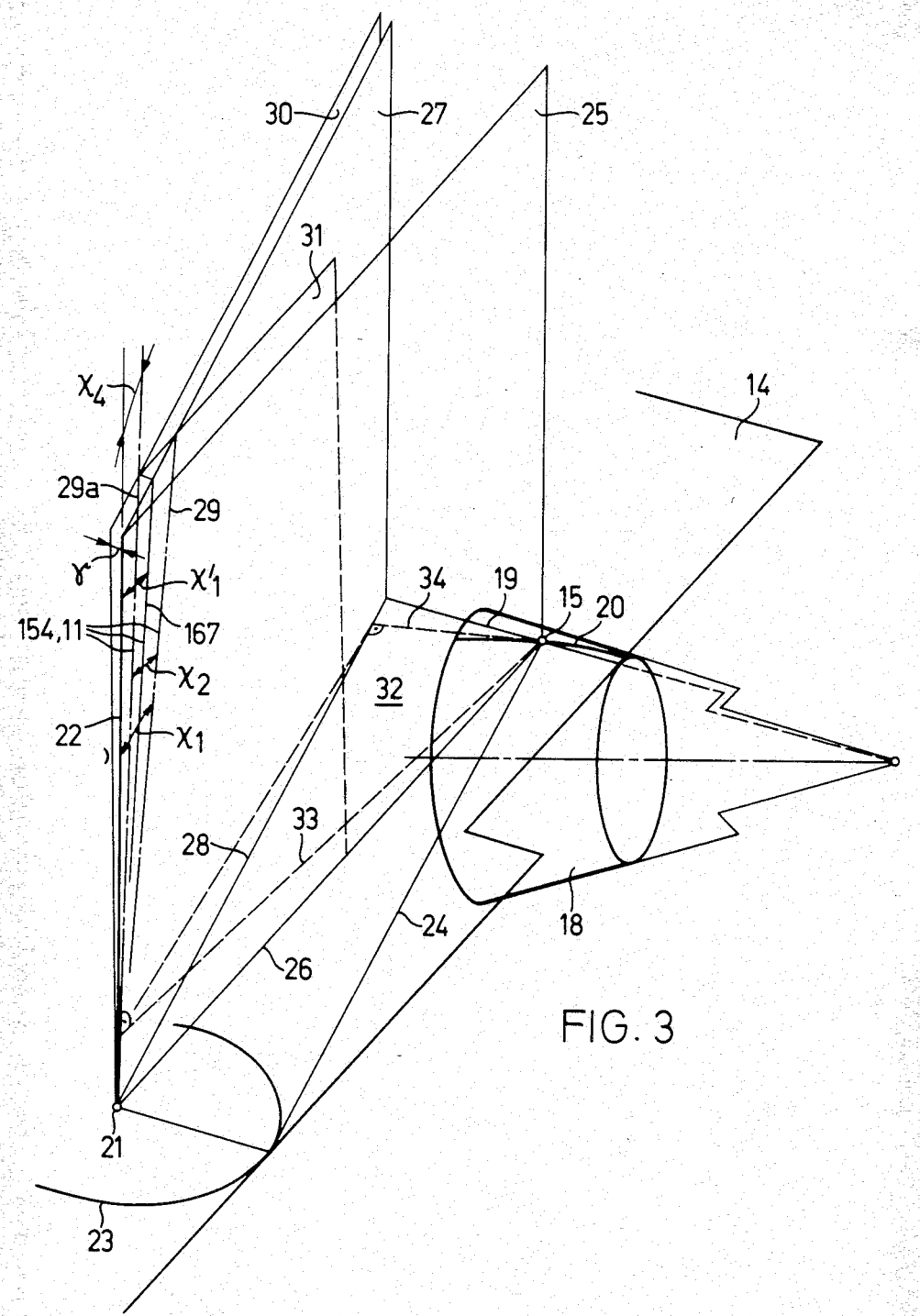
FIG. 3 schematically illustrates different geometric magnitudes or values which are important during gear cutting.

Continuing, in FIG. 3 there will be apparent, just as was the case for FIGS. 1 and 2, only a pitch surface 18 of a gear which is to be manufactured, for instance a bevel gear 8. The tangential plane 14 contacts the pitch surface 18 at a generatrix 19. Also the computation or operating pitch point 15 for a tooth lengthwise line 20 of a not here particularly further illustrated tooth flank is located on this generatrix 19. Reference character 21 designates the intersection or penetration point of the cutter head axis 11 through the tangential plane 14. Furthermore, there has been erected at the intersection point 21 a normal or perpendicular 22 at the tangential plane 14. The small generating circle is partially apparent in the form of an ellipse 23 in the tangential plane 14. Also located at this location at the tangent at the generating circle i.e. the ellipse 23 and extending through the computation or operating point 15 is a radius of curvature 24 of the tooth lengthwise line 20. At this time reference also may be made to FIG. 4. In order to better ascertain the spatial position of the cutter head axis 11 there are illustrated still further planes. A radial plane 25 which is formed by the normal or perpendicular 22 and a connection line 26 between the intersection or penetration point 21 and the computation or operating pitch point 15. The radial plane 25 contains the cutter or blade radii during passage of the cutting edges through the computation or operating pitch point 15 with the cutter head axis 11 dispositioned normal to the tangential plane 14 and intersects such tangential plane 14 at the connection line 26. A vertical plane 27 is formed by the normal or perpendicular 22 and a line 28 which is parallel to the radius of curvature 24 in the tangential plane 14, but extending through the intersection or penetration point 21. An inclined or oblique plane 30 which is inclined by an angle $\gamma$ with respect to the vertical plane 27 possesses in common with such vertical plane 27 the parallel line 28. This angle $\gamma$ is an acute angle and preferably amounts to $\pm 5°$.

A further plane 31 possesses in common with the radial plane 25 the connection line 26, is inclined towards such connection line 26 and intersects both the vertical plane 27 and the inclined plane 30. Intersection lines 29 and 29a of the plane 31 with the vertical plane 27 as well as with the inclined plane 30 define possible positions of the cutter head axis 11. During the determination of the position of the cutter head axis 11 there is considered in each case only one section or portion 154 protruding out of the side or face of the tangential plane 14 which faces away from the pitch surface 18. If the cutter head axis 11 is located, for instance, in a position where it is identical with the intersection line 29a then the not here particularly illustrated pitch points of the cutting edges of the cutters or blades move in a pitch point plane 32. This pitch point plane 32 is formed by a pitch point radius 33, disposed perpendicular to the cutter head axis 11, and by a normal or perpendicular 34 at the inclined plane 30 and taken through the computation or operating pitch point 15.

Figure 4:
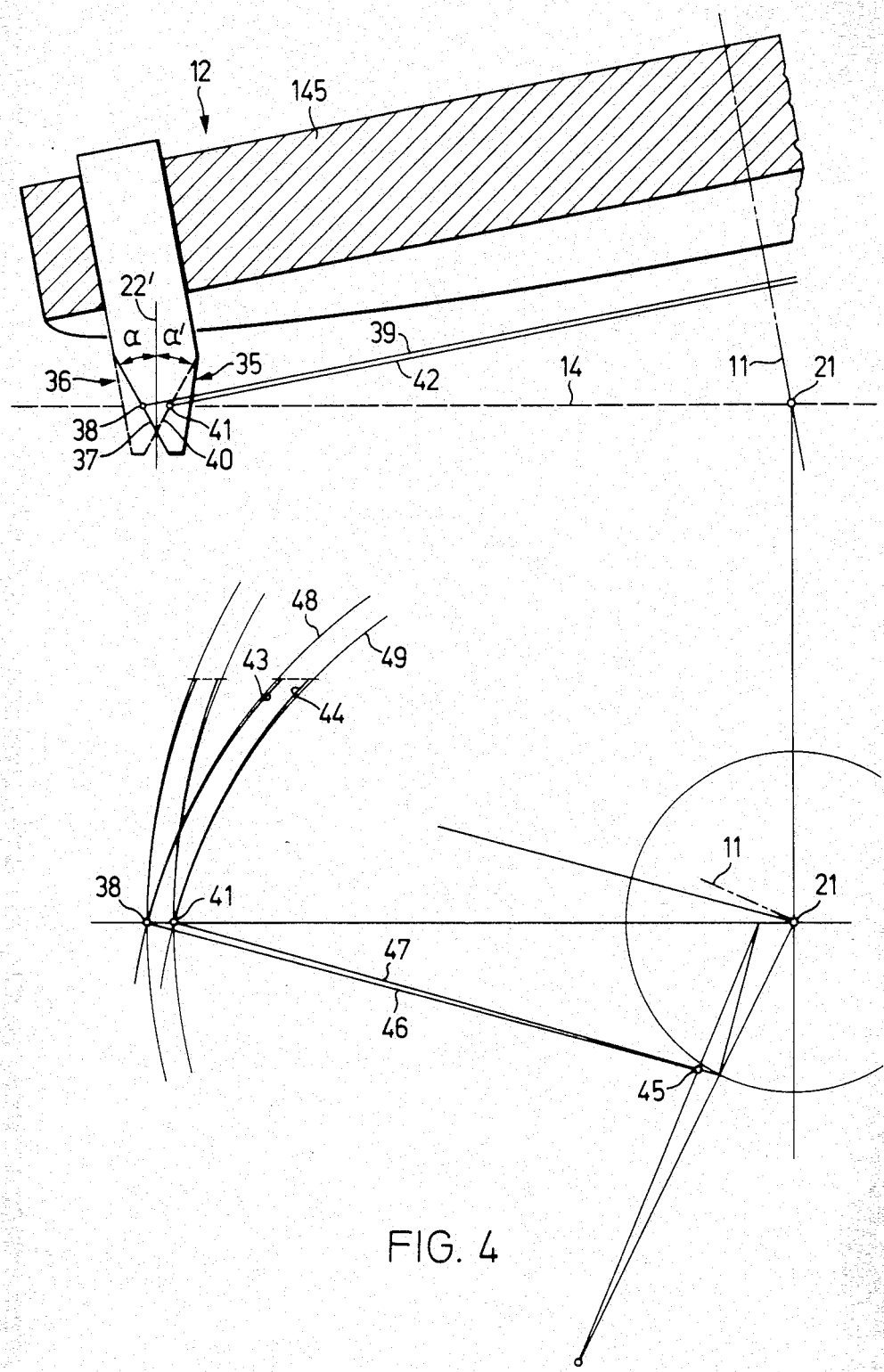
FIG. 4 schematically illustrates in respective front and plan views the geometric correlations prevailing at the cutter head.

Now at the upper portion of FIG. 4 there has been shown in front and sectional view and on an enlarged scale in relation to FIG. 1, part of the cutter head 12 which is rotatable about the cutter head axis 11. In plan view there is only visible of this cutter head 12 the cutter head axis 11. In a cutter head base body or holder arrangement 145 there are mounted as the cutters for each cutter group a respective external or outer cutter 35 as well as a phantom line illustrated internal or inner cutter 36. Since a group of cutters or blades usually consists of a plurality of cutters 35, 36, in this FIG. 4 there have been illustrated in the same plane, i.e. shifted in the plane of the drawing the cutters or blades 35 and 36 which carry the external or outer cutting edges 37 and the internal or inner cutting edges 40. In reality, the inner or internal cutter 36 is located in a plane which extends in spaced relationship from and inclined to the plane of the drawing, for instance corresponding to the spacing of the tangents 81 and 82 in the showing of FIG. 6 which will be discussed in greater detail hereinafter. An external or outer cutting edge 37 of the external cutter 35 intersects the not particularly illustrated pitch surface of the gear which is to be fabricated or the already known tangential plane 14 at a pitch point 38 which, in plan view, is at the same time identical with the computation or operating pitch point 38 in this position. The pitch points 38 of all of the external cutting edges 37 are located upon an external pitch point plane 39. The external cutting edge 37, during passage through the computation or operating pitch point 38, encloses with a normal or perpendicular 22' to the tangential plane 14 an angle $\alpha$. The internal cutting edge 40 encloses, in similar fashion with the normal or perpendicular 22', an angle $\alpha'$. The angles $\alpha$ and $\alpha'$ thus correspond at least approximately to a mean or average normal attack angle $\alpha_n$.

An internal cutting edge 40 of the internal cutter or blade 36 intersects at the tangential plane 14 at a pitch point 41 which, at the same time in plan view, is identical to the computation point 41. An internal pitch point plane 42 contains the pitch points 41 of all of the internal cutting edges 40. The pitch points or computation points 38 and 41 each belong to respective tooth lengthwise lines 43 and 44, which have been illustrated instead of a respective internal and external flank of a tooth. In such illustration that cutting edge which cuts the concave tooth flank has always been designated as the external or outer cutting edge. In corresponding manner there has been designated as the internal or inner cutting edge that cutting edge which cuts the convex flank of a lengthwise curved gear tooth.

The computation point 38 apparent from the plan view of FIG. 4 belongs to an internal flank of a gear tooth, of which there has been illustrated the tooth lengthwise line 43. In corresponding manner the computation point 41 belongs to an external flank and its tooth lengthwise line 44. Reference character 45 designates a curvature centre of both tooth lengthwise lines 43 and 44 at the computation points 38 and 41, respectively. From this location there extend the radii of curvature 46 and 47 to the computation points 38 and 41, respectively. Without inclining the cutter head axis 11 there would thus result tooth lengthwise lines 48 and 49 which, however, would not possess the desired characteristics. In reality, during the meshing of two teeth of respective coacting gears of a pair of gears it is approximately the case that the computation point 38 of the counter flank comes to lie at the computation point 41. Hence, the outer flank of a tooth possesses the smaller radius of curvature 47, the inner tooth flank the larger radius of curvature 46. Due to the thus produced tooth crown it is possible to obtain the desired loadbearing or supporting image for the gear teeth.

Figure 5:
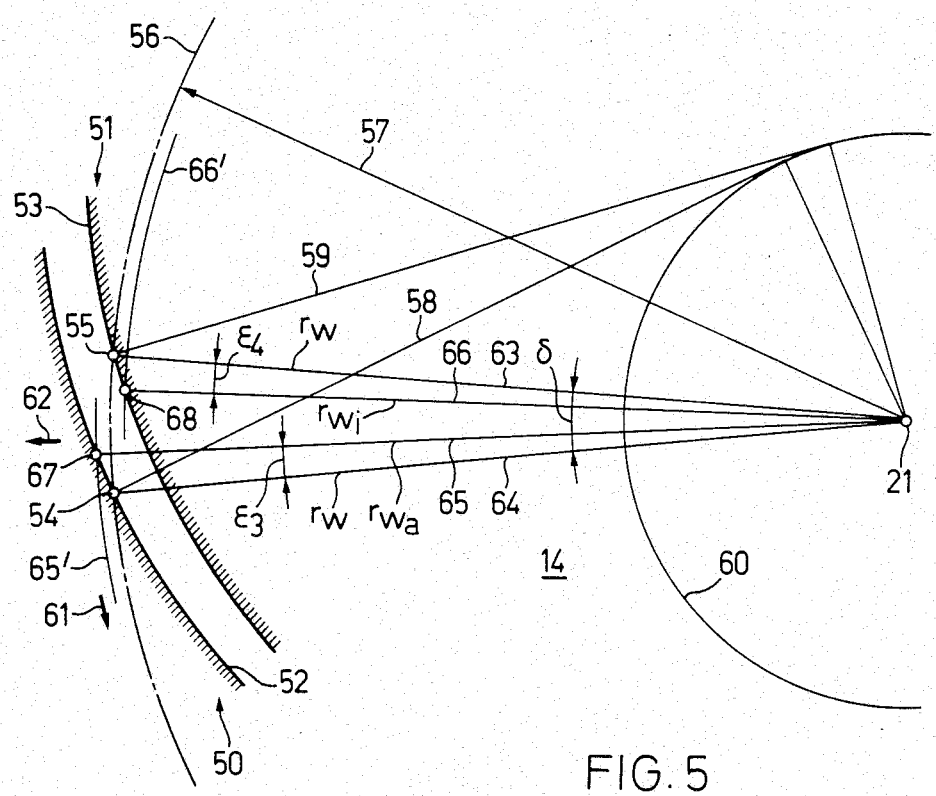
FIG. 5 is a schematic illustration of the cutter paths in the pitch surface of the gear to be fabricated.

In FIG. 5 there have been illustrated a respective internal flank 50 and an external flank 51 of two neighbouring teeth of a gear in the pitch surface in the form of tooth lengthwise lines 52 and 53, respectively. In order to cut these tooth flanks 50 and 51 there is provided a cutter head whose cutter head axis 11 intersects the tangential plane 14 at the penetration point 21, and this tangential plane 14 is identical with the plane of the drawing.

If the tooth flanks, for instance, are not crown cut in known manner, then the computation points 54 and 55 are of significance. Since the computation points 54 and 55 are located at the circumference of a circle 56 having a radius 57, the inner or internal flank 50 and the outer or external flank 51 possess the same radius of curvature 58 and 59, respectively, at the region of the computation points 54 and 55, respectively. The radii of curvature 58 and 59 approximately correspond to the length of the tangents at a generating circle 60 through the relevant computation points 54 and 55, respectively. The arrow 61 designates the direction of rotation of the cutter head, the arrow 62 the approximate direction of movement of the tooth flanks 50 and 51. In this regard it is also not to be forgotten that the tooth lengthwise lines 52 and 53 form partial sections of a cycloid, which here have been approximately illustrated at the neighbourhood of the computation or operating pitch points 54 and 55 as arcuate sections or arcs. Furthermore, an angle $\delta$ between the cutter radii 63 and 64 for the computation or operating pitch points 54 and 55 corresponds to the regular or uniform angular distribution of the cutters or blades in the cutter head which carry the internal cutting edges and the external cutting edges, respectively. In other words, the computation or operating pitch point 54 simultaneously also constitutes the pitch point at an external cutting edge, the computation or operating pitch point 55 the pitch point at an internal cutting edge.

Now if in accordance with the invention the tooth flanks 50 and 51 should be crown cut, then there are arranged at the cutter head 12 the external cutting or cutter edges 37 along a circle 65' having a larger radius 65, the internal cutting or cutter edges 40 along a circle 66' having a smaller radius 66. However, in order to be able to crown cut as heretofore in principle the same tooth flanks 50 and 51, the external cutting edges 37 and the internal cutting edges 40 must remain at the same cycloids, which have been approximately illustrated by the tooth lengthwise lines 52 and 53. This means that now the external cutting edge 37 is illustrated by a new computation or pitch point 67, the internal cutting edge 40 by a computation or pitch point 68. The external cutting edge therefore has been shifted back through an angle $\epsilon_3$, the internal cutting edge has been forwardly shifted or displaced through an angle $\epsilon_4$.

Figure 6:
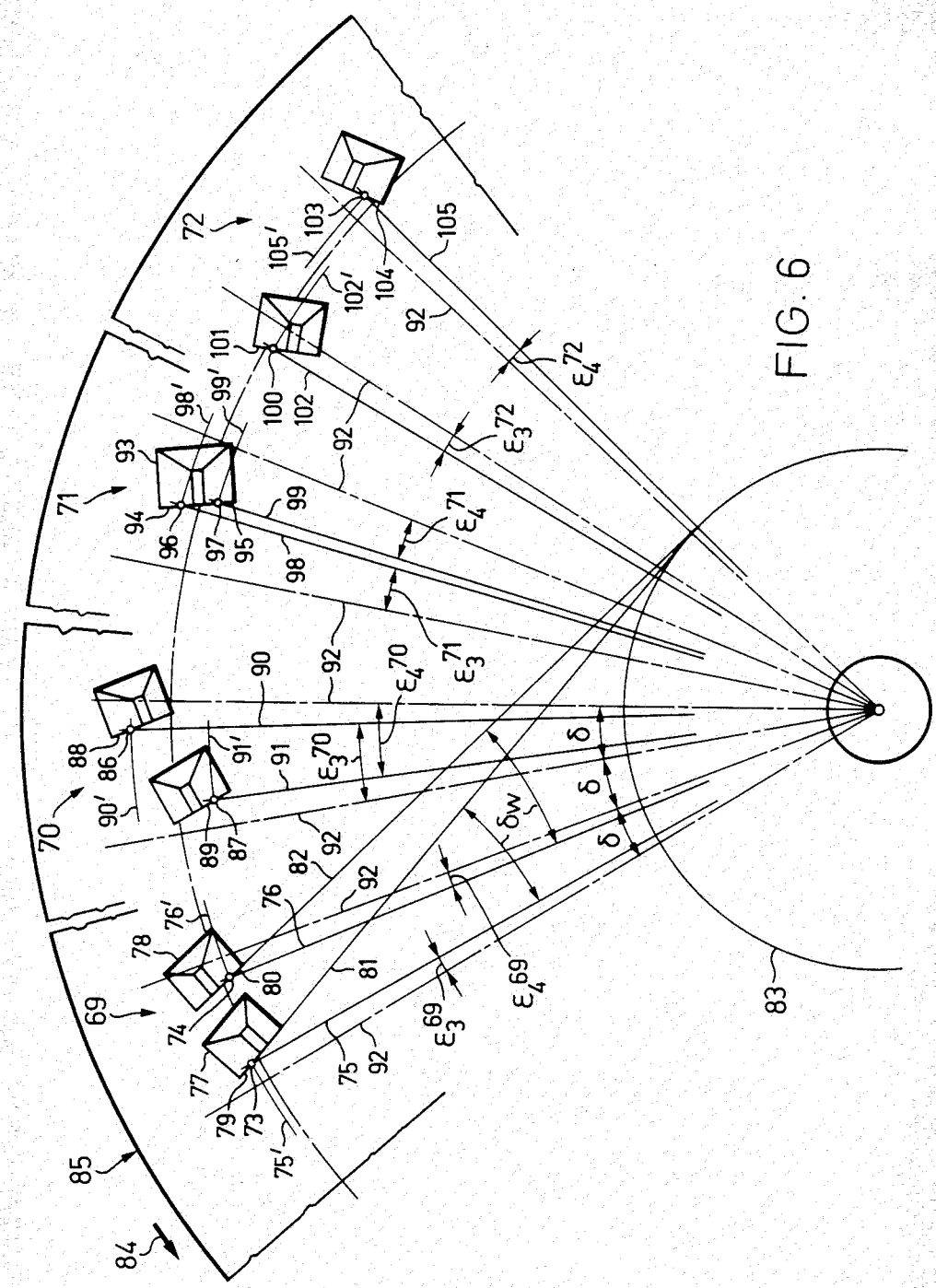
FIG. 6 is a simplified illustration of the arrangement of the cutters or blades at a cutter head.

FIG. 6 illustrates a cutter head 85 which possesses a plurality of different types of cutter groups 69, 70, 71 and 72. In the description to follow there will be considered in detail the individual cutter groups 69, 70, 71 and 72 as to their specific features. Yet, it is clear for one skilled in the art that a cutter head which can be used in actual practice always only has cutter groups of one type which are mutually identical. This arrangement of different cutter groups at a cutter head serves exclusively for illustrative purposes.

Pitch points 73 and 74 of the external cutters 77 and the internal cutters 78, respectively, of the cutter group 69 are located upon circles 75' and 76', respectively, having different respective radii 75 and 76. An external or outer cutting edge 79 and an internal or inner cutting edge 80 is respectively located in a plane, whose intersection with the plane of the drawing, forms a respective tangent 81 and 82 at a generating circle 83. The radii 75 and 76 enclose with the related tangent 81 and 82 what has been termed herein as the helix angle $\delta_w$. An arrow 84 indicates the direction of movement of the cutter head 85. It is to be observed that in the cutter group 69 the external cutting edges 79 and internal cutting edges 80 are respectively displaced through an angle $\epsilon_3^{69}$ and $\epsilon_4^{69}$, respectively, from the uniform angular distribution or pitch according to the lines 92, each of which are pivoted from one another through the angle $\delta$. The internal cutter 78, viewed in the direction of movement, follows in trailing fashion the external cutter 77.

At the cutter group 70 pitch points 86 and 87 of the external cutting edges 88 and the internal cutting edges 89 are arranged at circles 90' and 91', respectively, which likewise possess different radii 90 and 91, respectively. Since the difference of the radii 90 and 91 is greater than the difference between the radii 75 and 76, the cutter group 70 produces a more pronounced tooth crown or camber than the cutter group 69. It is to be observed that the radii 90 and 91 also must follow different angles $\epsilon_3^{70}$ and $\epsilon_4^{70}$, respectively. Thus, the outer or external cutting edge 88, viewed in the direction of movement, comes to lie behind the internal cutting edge 89.

The cutter group 71 consists of a single cutter or blade 93 which carries an external cutting edge 94 and an internal cutting edge 95. Pitch points 96 and 97 also in this case are located at different circles 98' and 99' having the radii 98 and 99, respectively. The pitch points 96 and 97 also, in this case, are pivoted away from the lines 92 through the angle $\epsilon_3^{71}$ and $\epsilon_4^{71}$, respectively.

It is possible to designate the cutter groups 69, 70 and 71 as cutter groups which produce a positive tooth crown, i.e. a crown where the external flanks of the teeth are curved more pronounced than the curvature at the inner or internal flanks. In this respect reference is also made to FIG. 12. With these cutter groups 69, 70 and 71, in the showing of FIG. 6 the angle $\epsilon_3$ in each case has been shifted in the direction where the pitch points 73, 86 and 96 of the external cutting edges 79, 88 and 94 are placed upon larger radii 75, 90 and 98, respectively. Accordingly, the pitch points 74, 87 and 97 of the internal cutting edges 80, 89 and 95, respectively, are displaced by the laying-off of the angle $\epsilon_4$ in the sense that they are placed upon smaller radii 76, 91 and 99, respectively. With these three cutter groups 69, 70 and 71 the external cutting edges are located upon larger radii than the internal cutting edges.

In contrast thereto, in the case of the cutter group 72 a pitch point 100 of an external cutting edge 101 is located upon a circle 102' having a smaller radius 102 than a radius 105 of a circle 105' at which there is located a pitch point 103 of an internal cutting edge 104. This correspondingly results in a negative crown (see FIG. 13). The inner flank of a tooth is thus curved more markedly than its outer or external flank. This is obtained in that the angle $\epsilon_3^{72}$ and $\epsilon_4^{72}$ are layed-off in the opposite direction than such was the case for the cutter groups 69, 70 and 71.

Figure 7:
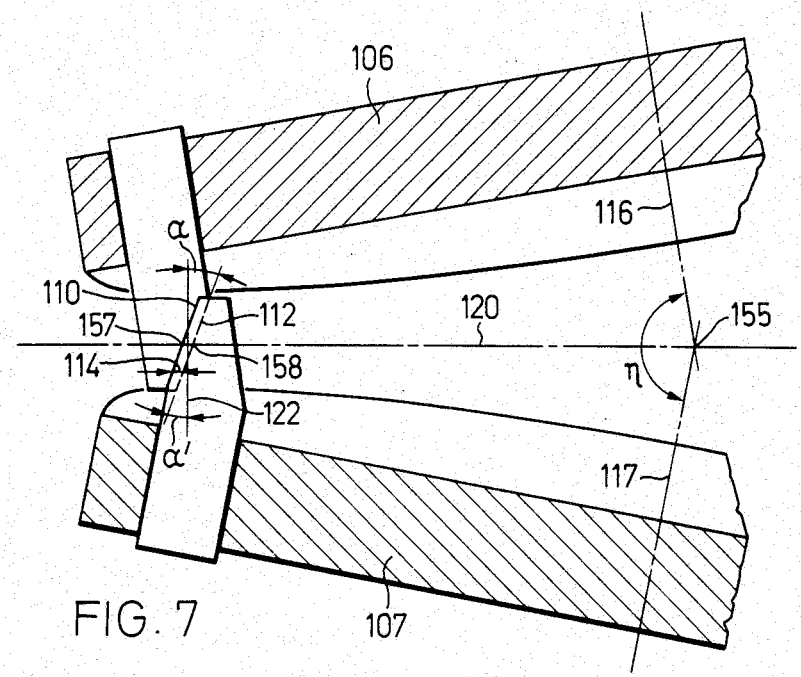
FIGS. 7 and 8 respectively schematically illustrate two cutter heads in sectional view in their mutual position during cutting of corresponding tooth flanks.
Figure 8:
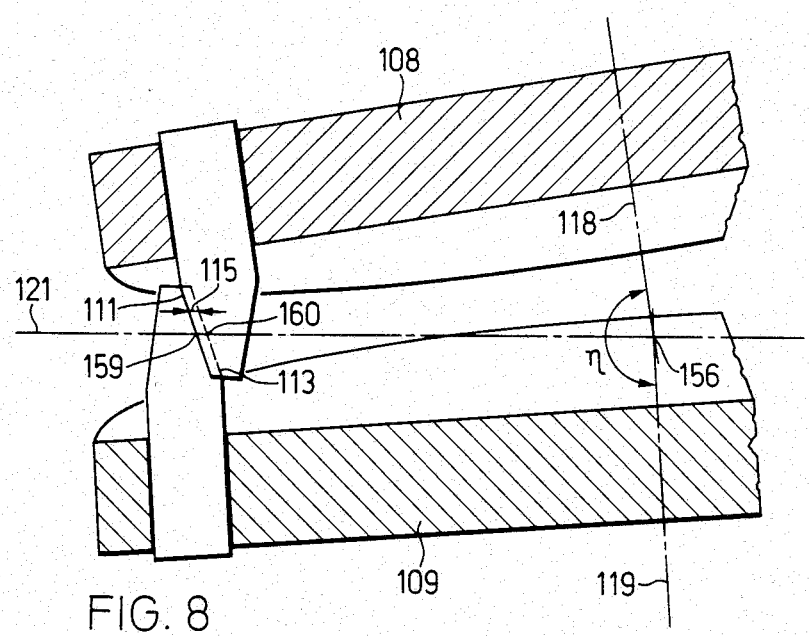

In FIGS. 7 and 8 there have been illustrated two respective cutter heads 106 and 107 and 108 and 109 which have been located opposite one another such that between a respective external cutter edge 110 and 111 and a respective internal cutting edge 112 and 113 there is produced a radii difference 114 and 115, respectively, between the cutter radii of the internal cutting edges 112 and 113 and the external cutting edges 110 and 111, respectively. Such mutual position is obtained, for instance, if with the arrangement of FIG. 1 the cutter head 13 is pivoted through 180° about the axis 17. As a result, the cutter head axes 116 and 117 and 118 and 119, respectively, intersect at the intersection points 155 and 156 in pitch planes 120 and 121, respectively, and pitch points 157 and 158 and 159 and 160 of the external cutting edges 110, 111 and the internal cutting edges 112, 113, respectively, of such cutter head pairs 106 and 107 and 108 and 109, respectively, are likewise located upon the common pitch planes 120 and 121, respectively. Both of the cutter head axes 116 and 117 and 118 and 119, respectively, in the embodiment under discussion, enclose an angle $\eta$ which is smaller than 180°. Since the cutter head axes 116, 117, 118 and 119, in the arrangement of FIGS. 7 and 8, also are inclined towards the plane of the drawing, it is not possible to observe the angle $\eta$ in its actual size.

Additionally, it will be apparent from the illustration of FIGS. 7 and 8 that the external cutting edges 110 and 111 and the internal cutting edges 112 and 113 are inclined such that during passage through the radial plane 25 (see FIG. 3), which here corresponds to the plane of the drawing, they enclose with a normal 122 to the pitch plane 120 and 121, respectively, —which in FIG. 3 corresponds to the tangential plane 14—a normal attack angle $\alpha$ and $\alpha'$, respectively, which corresponds to the normal angle of attack of the gear teeth which are to be fabricated.

Figure 9:
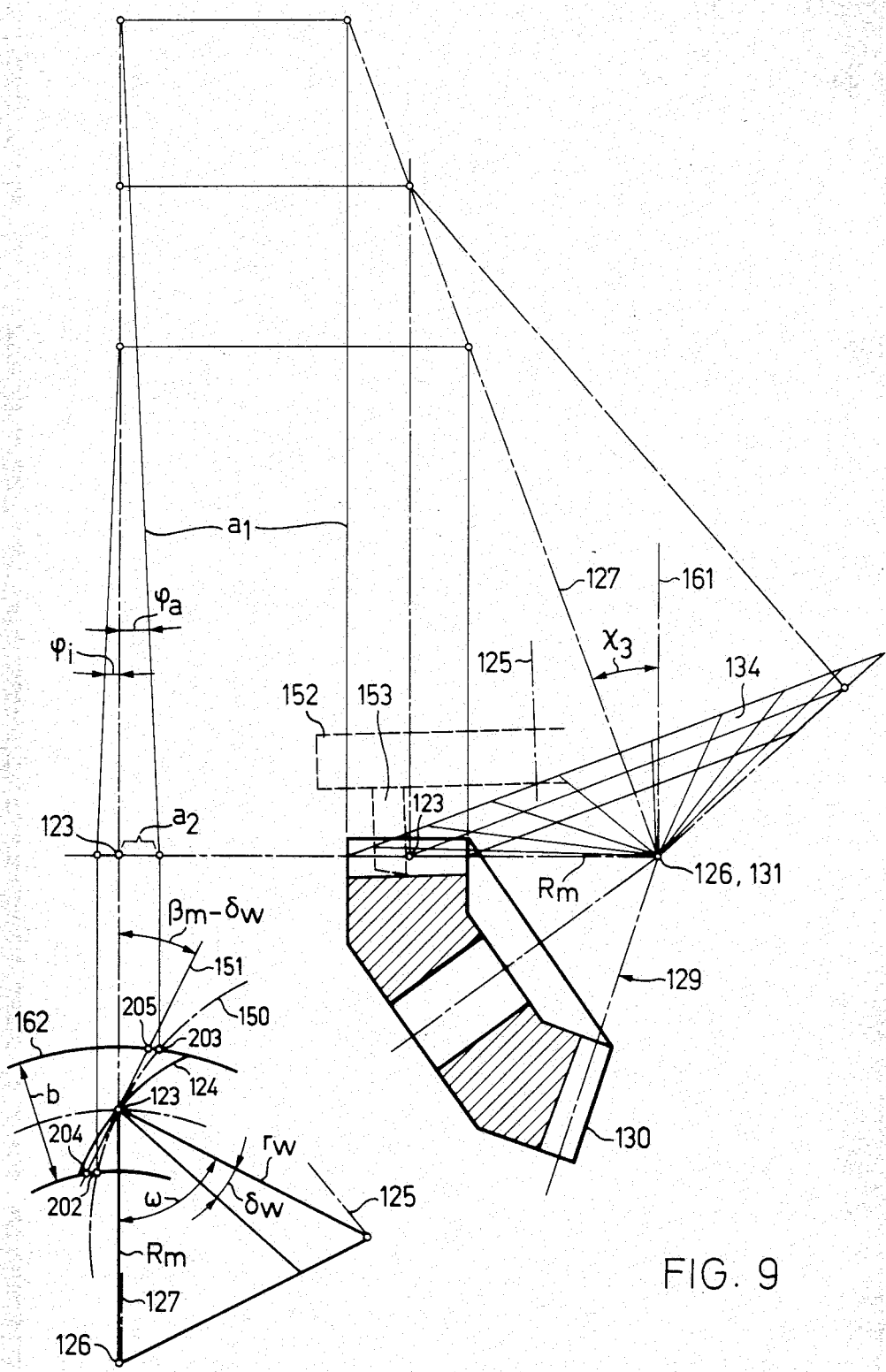
FIG. 9 is a further schematic illustration of the geometric relationships which prevail during gear cutting.

FIG. 9 illustrates a further schematic arrangement of the most important elements during cutting of teeth flanks. FIG. 9 consists of a front view at the right-half portion of the showing as well as a related schematic side view and a top plan view, both of the latter being illustrated at the left-hand hand portion of the drawing. Both the front view and side view and the top plan view illustrate a computation point 123 of a tooth lengthwise line 124 which only is shown in plan view, and produced in conventional manner, and further illustrate a cutter head axis 125 which corresponds to the cutter head axis 11 of FIG. 4. Since the tooth flank, which is illustrated by the tooth lengthwise line 124, is produced by a generating operation, there is also employed a generating drum axis 127. This generating drum axis 127, in the front view, piercingly extends through a pitch cone 129 of a bevel gear 130 which is to be produced at the point 126 which coincides with the apex 131 of the pitch cone 129. Also extending through the apex or tip 131 and inclined through an angle $\chi_3$ with respect to the generating drum axis 127 is a crown gear axis 161 of a partially and schematically shown crown gear 162 which has been illustrated in plan view. A cutter head 152 containing the cutters or blades 153 has been shown in broken or phantom lines and is arranged to be rotatable about the cutter head axis 125. Hence, the not here further illustrated cutter pitch points move along a circle 150. A tangent 151 is laid at the circle 150 through the computation point 123. Viewed in front view the cutter pitch points, during the generating movement, move along a conical surface 134. Further comments concerning FIG. 9 are given hereinafter during explanations concerning the computation.

Figure 10:
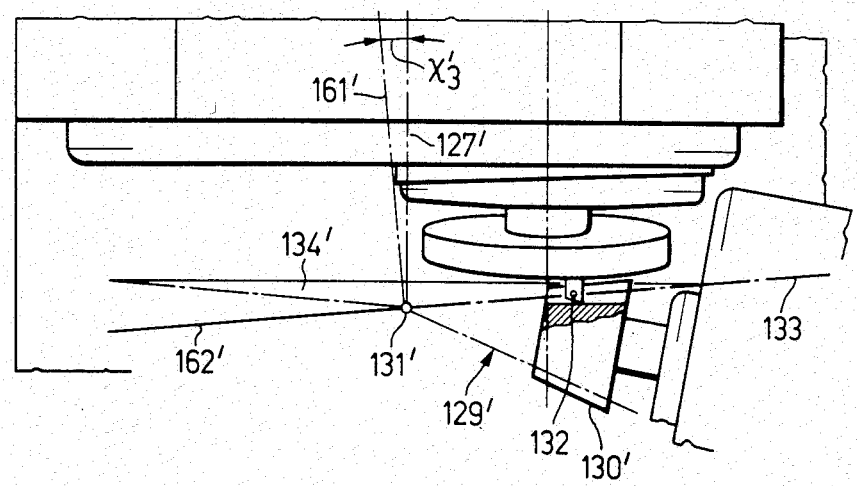
FIG. 10 is a top plan view, analogous to the showing of FIG. 2, depicting other geometric relationships during gear cutting.

FIG. 10 likewise illustrates a generating drum axis 127' for another bevel gear 130'. A pitch cone 129' of the bevel gear 130' to be fabricated intersects at its apex 131' the generating drum axis 127'. By virtue of this arrangement, where a generatrix 133 of the pitch cone 129' containing a cutter pitch point 132 no longer is disposed perpendicular but rather at an inclination with respect to the generating drum axis 127', the cutter pitch point 132, during the generating motion, moves along a conical surface 134'. Also in this case there will be seen a crown gear axis 161' which intersects the apex or tip 131'. This crown gear axis 161' is disposed perpendicular to the crown gear 162', of which there only has been shown the pitch plane. The crown gear axis 161' and the generating drum axis 127' enclose an angle $\chi'_3$.

Figure 11:
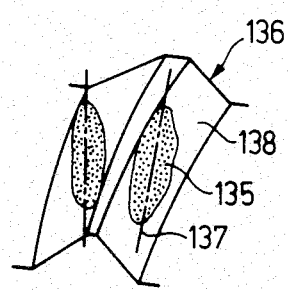
FIG. 11 is a perspective illustration of a gear tooth.

FIG. 11 shows a load-carrying image 135 of a gear tooth 136 of a pair of gears, wherein at least one of both gears have been produced with the machine settings of FIGS. 9 and 10. An axis 137 of the load-carrying or load-bearing image 135 extends approximately in a diagonal of a tooth flank 138.

Figure 12:
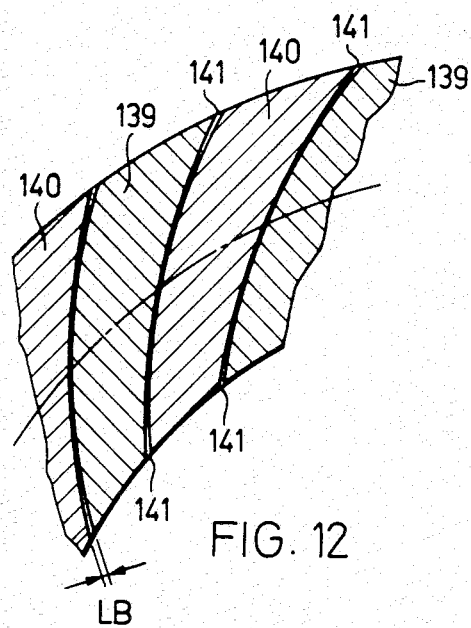
FIG. 12 is a section through a crown gear.

FIG. 12 illustrates a sectional view in a pitch surface of a pair of gears which are meshing with one another and wherein reference character 139 designates the teeth of the one gear and reference character 140 the teeth of the other gear, which possess a positive crown. This will be recognised by the air gap 141 which appears at the marginal regions, and at that location possess a width LB.

Figure 13:
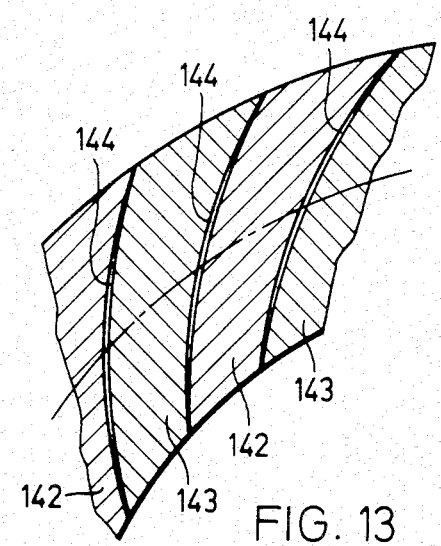
FIG. 13 is a further section through a crown gear.

FIG. 13 illustrates in sectional view, analagous to the sectional showing of FIG. 12, a pair of gears having teeth 142 and 143, which possess a negative crown. This can be recognised by an air gap 144 which is formed at the tooth centre.

Figure 14:
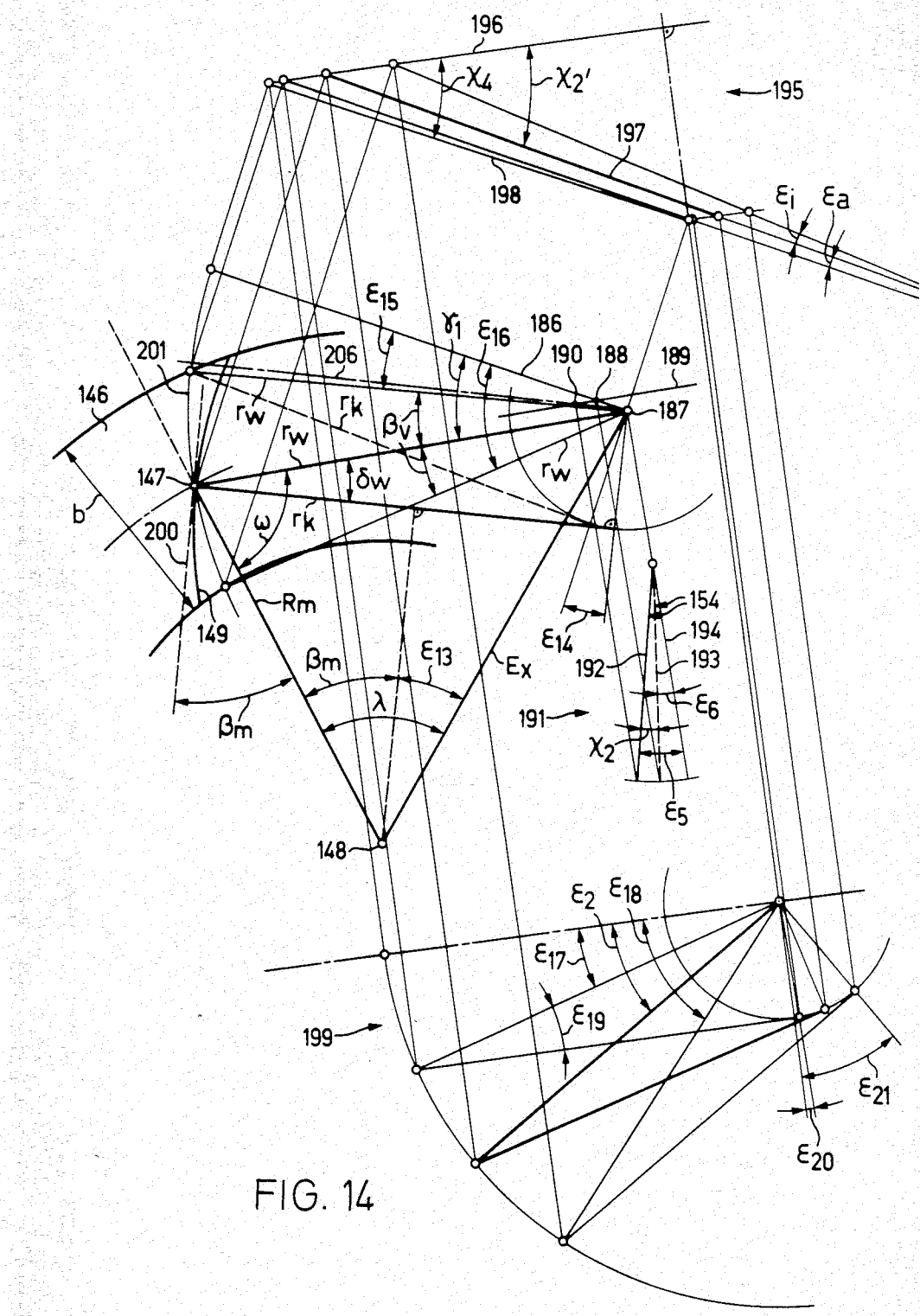
FIG. 14 is a schematic illustration of the cutting geometry.

FIG. 14 is a schematic illustration of the geometric relationships which prevail during fabrication of the tooth lengthwise line 149 of a crown gear 146. In FIG. 14 there have been shown magnitudes which arise during the course of the later herein described computation operation. At the centre of the illustration there is apparent a triangle which is constituted by a cutter radius $r_w$, a distance $E_x$ and a crown gear radius $R_m$. At the corner points of the triangle there will be recognised a computation point 147 of the tooth lengthwise line 149, a point 187 at which a cutter head axis pierces the plane of the drawing or the plane of the crown gear, and a crown gear centre 148. At the crown gear 146 reference character b designates the length of the teeth in radial direction. Hence, this dimension b thus corresponds to the width of the gear blank which is to be provided with gear teeth, and which here has not been further illustrated. At the tooth lengthwise line 149, which represents a tooth flank, fabricated according to a continuous method, there is placed a tangent 200. This tangent 200 encloses a spiral angle $\beta_m$ with the crown gear radius $R_m$. Not here further illustrated pitch points of the cutting edges of the cutters move along a circle 201 about the point 187. Cutter head axes which have been set or adjusted in accordance with the inventive method, extend from the point 187 for instance to a point 190. Such is located at a vertical plane perpendicular to the plane of the drawing. This perpendicular or vertical plane, corresponding to the vertical plane 27 of the showing of FIG. 3, has been illustrated by the straight line 206 which extends essentially parallel to the radius of curvature $r_k$ at the computation point 147. It is also possible for the cutter head axis to extend to a point 188, which corresponds to an inclination in the inclined plane 30 according to FIG. 3. A straight line 189, which interconnects the points 188 and 190, if translated into the showing of FIG. 3 would belong to the plane 31. A flipped-over arrangement, as shown by reference character 191, about the straight line 189 illustrates the section 154 of a cutter head axis in positions according to the straight lines 192, 193 or 194 in the plane 31 according to FIG. 3. There will be recognised the angle $\chi_2$, $\epsilon_5$ and $\epsilon_6$. A line 186 interconnects the points 187 and 188. This line 186, during a further flipping-over, as indicated by reference character 195, again appears as a line 198. In the flipped-over arrangement 195 there will be recognised the plane of the cutter head radii $r_w$ as a line 196 as well as a projection of the radius of curvature $r_k$ at the computation point 147 as a line 197. In the flipped-over arrangement 195 there also will be recognised the angles $\chi_4$ and $\chi'_2$. The angle $\chi_4$ corresponds to the angle between the normal 22 (FIG. 3) and the end position of the cutter head axis 11 in the intersection line 29a. Equally, there will be recognised the twist of the teeth $\epsilon_i$ for the inner half of the crown gear 146 and $\epsilon_a$ for the outer half of such crown gear. A flipped-over arrangement, as indicated by reference character 199, about the line 196 is particularly suitable for showing the angles $\epsilon_2$, $\epsilon_{17}$, $\epsilon_{18}$, $\epsilon_{19}$, $\epsilon_{20}$ 0 and $\epsilon_{21}$, constituting intermediate values for the computation. These and further magnitudes, which have not yet been discussed, will be considered in detail at a later portion of this description.

Figure 15:
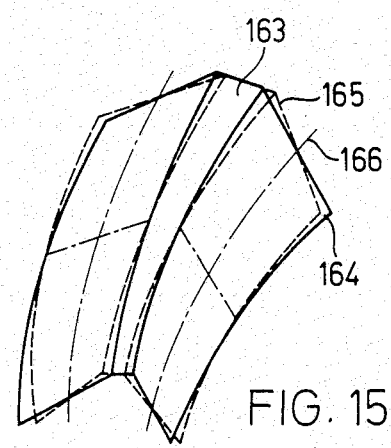
FIG. 15 is a further perspective view of a gear tooth.
Figure 16:
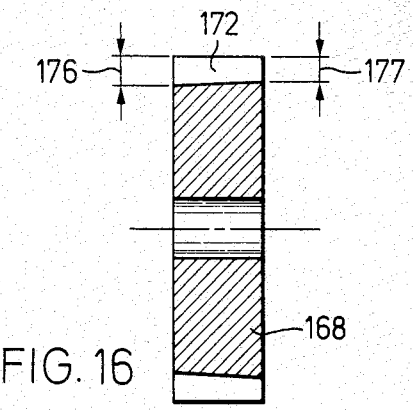
FIG. 16 is a sectional view through a spur gear.
Figure 17:
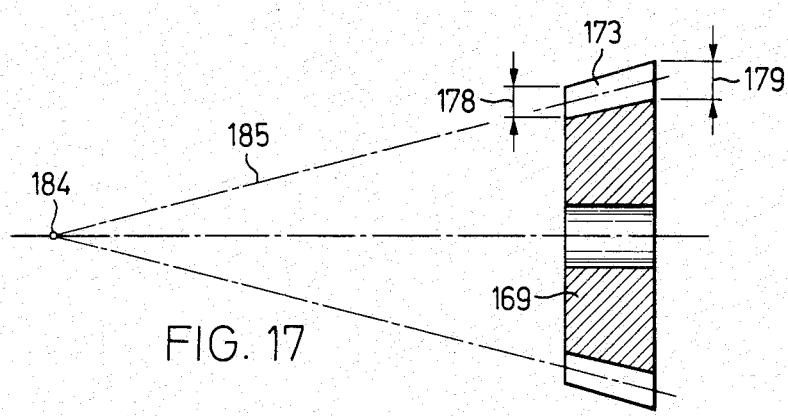
FIG. 17 is a sectional view through a bevel gear.
Figure 18:
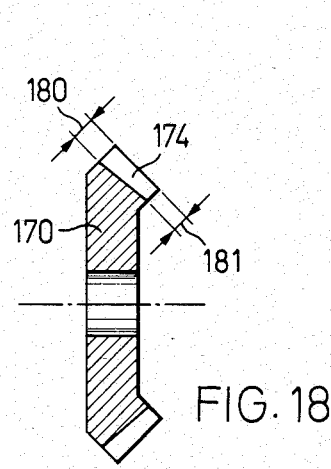
FIG. 18 is a sectional view through a further bevel gear.
Figure 19:
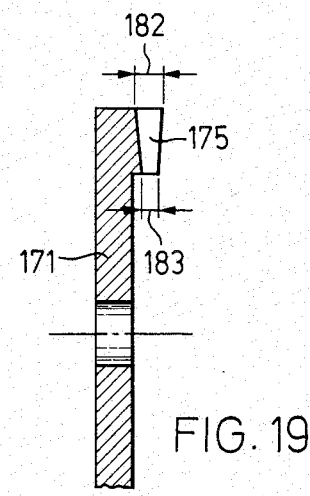
FIG. 19 is a sectional view through a face or crown gear or part of a jaw or dog clutch.

FIG. 15 shows a tooth 163 of a gear. In its untwisted condition it possesses, for instance, the shape 164 according to the full or solid lines. In the twisted condition it has the shape 165 which has been represented by the broken lines. Both shapes 164 and 165 have in common therewith a tooth lengthwise line 166 in the pitch surface.

FIGS. 16, 17, 18 and 19 illustrate a respective spur gear 168, a respective bevel gear 169 and 170 and a crown gear 171 in sectional view. All of these gears 168, 169, 170 and 171, fabricated in accordance with the inventive method, possess teeth 172, 173, 174 and 175, respectively, which possess at their ends different teeth heights 176 and 177, 178 and 179, 180 and 181 and 182 and 183, respectively. In the case of bevel gears, such as for instance the bevel gear 169, the smaller tooth height 178 of the tooth 173 preferably has confronting thereat a cone centre 184 of a pitch cone 185. The crown gear 171 can also be designed as part of a jaw or dog clutch.

Figure 20:
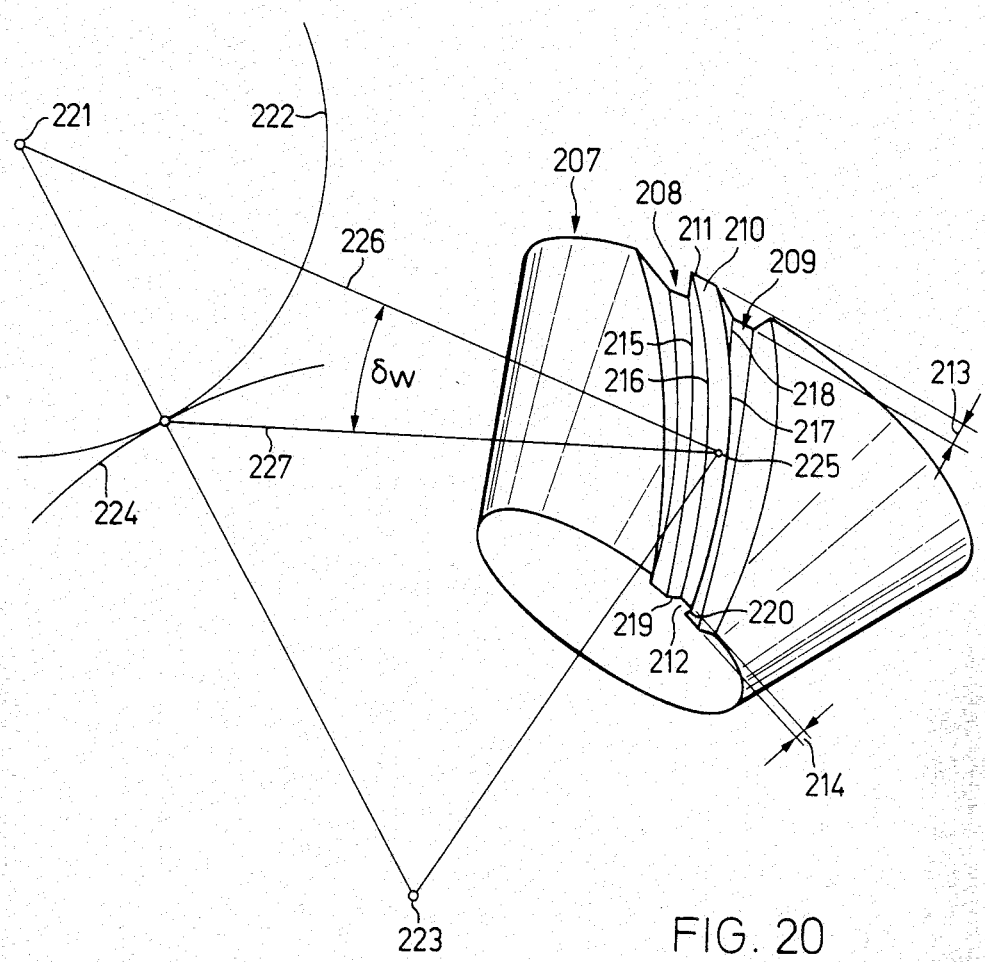
FIG. 20 is a perspective view of a bevel gear.

FIG. 20 illustrates a gear 207 at which, for instance, there have been illustrated two tooth gaps 208 and 209 which are separated from one another by a gear tooth 210. At the tooth ends 211 and 212 there are measured different tooth heights 213 and 214. For instance, the tooth height 213 is greater than the tooth height 214. The tooth 210 is bounded by cycloid-shaped tooth lengthwise lines 215, 216, 217 and 218. In this embodiment the tooth 210 possesses straight tooth flanks 219 and 220. There are likewise apparent a point 221 serving as the centre of a small generating circle 222 and a point 223 serving as the centre of a large generating circle 224. Also a computation point 225 has been indicated at the tooth 210. However, in reality, this computation point 225 is located in the not here further shown pitch surface of the gear 207. The points 221, 223 and 225 form a tangential plane at the pitch surface of the gear 207. At this tangential plane there will be recognised the orientation angle δ between a measuring radius 226 and a radius of curvature 227, for instance the tooth lengthwise lines 216 and 217. Of course, there are also possible generated involuteshaped tooth flanks and produced according to the inventive method. There will be recognised that the orientation angle $δ_w$ is greater than 19°, and thus is located in a range which is particularly advantageous for the inventive method.

Having now had the benefit of the foregoing discussion the mode of operation of the herein disclosed in greater detail:

To produce a pair of gears possessing lengthwise crowned gear teeth it is possible for both the teeth of both gears and also only the teeth of one gear to be constructed to be lengthwise crowned. In other words, the internal tooth flanks and the external tooth flanks of the gear teeth of the one gear can possess the same radii of curvature, whereas the internal flanks and the external flanks of the teeth of the mating gear can possess different radii of curvature. Since the crown of gear teeth of course serves the purpose of influencing the contact surface of tooth flanks which mesh with one another, the so-called load-carrying image, it is the purpose of the invention to be able to vary the radii of curvature of the intermeshing tooth flanks during the fabrication of the gear teeth in order to achieve this objective.

In the description to follow the inventive method for fabricating lengthwise crowned gear teeth will be described in detail based upon an embodiment involving a bevel gear. In conventional manner, shown in FIG. 1, a bevel gear blank 8' is attached to the spindle 9 and a cutter head 12 is secured to the pivot mechanism or device 10. Starting from the known setting of the gear cutting machine 1 for fabricating non-crowned gear teeth at the bevel gear blank or body 8', the setting of the cutter head axis 11 of the cutter head 12 must be corrected for practicing the inventive method. In FIG. 3 the normal 22 constitutes the position of the cutter head axis 11 in the aforementioned setting for non-crowned gear teeth. Hence, according to the invention the cutter head axis 11 is inclined in the vertical plane 27 through the angle $χ_1$ towards the generatrix 19, which carries the computation or operating pitch point 15, until it for instance assumes the position of the intersection line 29. The selection of the magnitude of the angle $χ_1$ as well as the further angles and the distances, will be explained more fully hereinafter. Starting from the position inclined through the angle $χ_1$, it is possible in order to bring about additional corrections at the tooth flanks, to further carry out a pivotal movement in the opposite direction through the angle $χ_2$. This however is accomplished in the plane 31, so that at the end the cutter head axis 11 is located in the intersection line 29a with the inclined plane 30.

It should be clear that the just mentioned terminal or end position of the cutter head axis 11 in the intersection line 29a, which is inclined through an angle $χ_4$ and for instance accomplished for a desired gear, can also be obtained by inclining the cutter head axis 11 through a smaller angle $χ'_1$ in the position 167 as well as by subsequent inclination about an angle γ, as such would correspond to the inclination of the vertical plane 27 in the inclined plane 30. It would be equally conceivable to perform a number of alternative operations in order to be able to place the cutter head axis 11 in a desired terminal or end position 29 or 29a. To the extent that one of these techniques serves to place the cutter head axis 11 in a position, where it arrives in a plane which possesses those properties as the planes 27 and 30, then this position of the cutter head axis is to be considered as encompassed by the teachings of the invention and the protection intended to be afforded therefor.

As to the just described technique involving inclination of the cutter head axis 11 in the planes 27 and 30 there will be discussed the computations at a later point of this disclosure.

If, for instance, the cutter head axis 11 assumes a position like the intersection line 29a according to FIG. 3, then also the cutters must be arranged at the cutter head in an appropriate manner. This arrangement, among other things, resides in having their cutting edges 37, 40, as will be apparent from the illustration of FIG. 4, enclose, during passage through the radial plane 25, which corresponds to the plane of the drawing of FIG. 4, with a normal 22' with respect to the tangential plane 14 a respective angle α and α'. With different radii of curvature 46, 47 of the cutter paths and the tooth lengthwise lines 43, 44 the pitch points 38 and 41 of the external cutting edges 37 and the internal cutting edges 40 must be arranged at the respective external and internal pitch point planes 39 and 42. These planes 39 and 42 are parallel to one another and related to the position of the cutter head axis 11 in the intersection line 29a in FIG. 3, parallel or identical to the pitch point plane 32 which is formed from the normal 34 and the pitch point radius 33.

Hence, the cutter head axis 11 and the cutter head 12 assumes the new position with respect to the bevel gear body or blank 8' and the bevel gear 8, as will be apparent from the showing of FIGS. 1 and 2. Additionally, FIG. 1 illustrates also the position which the cutter head 13 assumes during cutting gear teeth at a mating gear for the bevel gear 8. If there is desired the same tooth crown as for the teeth of the bevel gear 8 then such position is symmetrical to the axis 17.

The cutter head 12 or 85, as the case may be, which is employed for cutting teeth at gears during inclination of the cutter head axis 11 in the just-described manner, can possess different types of cutter groups 69, 70, 71 and 72, as the same will be apparent from FIG. 6. The pitch points 38 of the external cutting edges 37, as will be apparent from the illustration of FIG. 4, are located in a pitch point plane 39 which is situated closer to the cutter head base body or holder 145 than the pitch point plane 42 of the pitch points 41 of the internal cutting edges 40. The same holds true for the corresponding pitch points and internal and external cutting edges of the cutter head 85 of the illustration of FIG. 6. An exception to this is constituted by the cutter group 72 of the cutter head 85 which renders possible the fabrication of negative crown at gear teeth. In this case the pitch point plane of the pitch points 103 of the internal cutting edges 104 are located closer to the cutter head base body 145 than the pitch point plane of the pitch points 100 of the external cutting edges 101.

Furthermore, as has already been explained above and also will be apparent from the illustration of FIGS. 7 and 8, the external cutting edges 110, 111 and the internal cutting edges 112, 113 are to be mounted at the cutter heads 106 and 107 and 108 and 109, respectively, in such a manner that upon passage of the external cutting edges 110 and 111 and the internal cutting edges 112 and 113 through the computation point of a tooth flank, such external and internal flanks are inclined in each case through an angle $\alpha$ and $\alpha'$, respectively, with respect to a normal 122 taken with regard to the pitch plane 120 and 121, respectively, which also corresponds to the tangential plane 14 of FIG. 3. The angle $\alpha$ and $\alpha'$ should at least approximately correspond to the normal attack angle of the teeth when in meshing engagement.

If it is intended to produce, instead of a bevel gear 8, a spur gear at the tooth cutting machine 1 of conventional design, then there must be secured in known manner the cutter head 12 at the spindle 9 of the headstock 5, however the spur gear blank or body must be attached to the generating or roll drum 4. Hence, starting with the known position of the cutter head axis and the pitch surface of the spur gear with regard to one another, there is then accomplished the just described corrections according to the invention. In this case the spur gear axis must carry out movements such that the cutter head axis 11 arrives relative thereto in the desired position. This is so because at the gear cutting machine 1 only the generating or roll drum 4 possesses a pivotal device or mechanism 10 which enables such correction movements.

During the computation of the magnitudes relevant for practicing the gear tooth cutting method of the invention as well as for designing a suitable cutter head the following procedures are followed by way of example:

It is assumed for instance that a certain desired gear blank is to be provided with gear teeth having a width or a tooth length b (see FIG. 14). Furthermore, there are prescribed the real-pitch module $m_n$, the normal angle of attack $\alpha_n$ as well as the spiral angle $\beta_m$ of the gear teeth. Equally, there is known the mean radius $R_m$ of the crown gear 146 which is employed for the computation. For instance, the crown gear radius $R_m$ for a bevel gear is equal to the spacing of the computation point 147 of the tooth lengthwise line 149 from a cone centre 148 which is identical with the crown gear centre 148. The desired lengthwise crown LB (FIG. 12) is predetermined.

Furthermore, there is available a cutter head which contains a number $Z_w$ of cutter groups, the cutters or blades of which still must be set or adjusted in radial direction. A mean cutter radius of the cutting edges is likewise predetermined and amounts to $r_w$. Also the value F is known for such arrangement of the cutters at the cutter head. The value F constitutes a displacement or shift angle which arises during displacement of the internal cutting edges or external cutting edges, as the case may be, out of the position which they assume at a cutter head which only possesses an internal cutting edge and an external cutting edge. This displacement of the internal and external cutting edges must be accomplished along the relevant cycloid and is divided again among the number $Z_w$ of the cutter groups, to the extent that a number of such cutter groups are present. For the case that the displacement $\epsilon_1$ of the cutters out of the uniform angular distribution $\delta$ is known it is possible to compute the value F from the Equation (I) as follows:

$$\epsilon_1 = F/2 \cdot Z_w \text{ or } \epsilon_3 = F_3/2 \cdot Z_w; \epsilon_4 = F_4/2 \cdot Z_w \qquad (I)$$

From these known magnitudes it is possible to derive further magnitudes needed for the computation. They are as follows:

(Compare FIG. 14)

$$\text{An orientation angle } \delta_w = \frac{Z_w \cdot m_n}{2 \cdot r_w} \qquad (II)$$

$$\text{An angle } \omega = 90° - \beta_m + \delta_w \qquad (III)$$

$$\text{A tooth number of the crown gear } Z_p = \frac{2 \cdot R_m \cdot \cos \beta_m}{m_n} \qquad (IV)$$

The spacing or distance $E_x$ of the centre of the crown gear to the cutter head axis:

$$E_x = \sqrt{R_m^2 + r_w^2 - 2 R_m \cdot r_w \cdot \cos \omega} \qquad (V)$$

$$\text{An angle } \lambda \text{ from } \cos \lambda = \frac{R_m^2 + E_x^2 - r_w^2}{2 \cdot R_m \cdot E_x} \qquad (VI)$$

An angle $\epsilon_{13} = \lambda - \beta_m$, and an external and an internal cutting edge radius from (VII)

$$r_{wa} - r_w = r_w - r_{wi} = \frac{m_n \cdot \pi \cdot F}{2 \cdot 360° \cdot \cos \delta_w} \qquad (VIII)$$

This is valid for external and internal cutting edges which are each offset through the same value F or angle $\epsilon_1$ from the uniform angular distribution $\delta$. In other cases the internal and external radius are to be separately calculated from the momentary F-value and the angle $\epsilon_3$ and $\epsilon_4$, respectively.

From equation IX it is possible to compute that proportion $LB_R$ of the lengthwise crown LB which is formed as a consequence of the difference of the cutter radii of the external cutters and internal cutters:

$$LB_R = \sqrt{r_{wa}^2 - \left(\frac{b}{2 \cos (\beta_m - \delta_w)}\right)^2} - \sqrt{r_{wi}^2 - \left(\frac{b}{2 \cos (\beta_m - \delta_w)}\right)^2} - \frac{F \cdot m_n}{\frac{360°}{\pi} \cos \delta_w} \qquad (IX)$$

Since, however, the cutter head axis is inclined through the angle $\chi_1$, also this angle $\chi_1$ must be computed. This is carried out with the aid of the Equations X and XI.

$$\tan \beta' = \tan \delta_w \cdot \tan \chi \cdot \tan \alpha \qquad (X)$$

A flank direction error $\beta'$ is computed from equation XI:

$$\tan \beta' = \frac{F \cdot \sin \epsilon_{13} \cdot \cos \beta_m}{\frac{360°}{\pi} \cdot Z_p \cdot \sin \lambda} \qquad (XI)$$

This oblique positioning of the cutter head axis through the angle $\chi_1$ results in a reduction in the crown by an amount $LB_{R'}$, which can be computed from Equation XII:

$$LB_{R'} = \qquad (XII)$$

-continued $$\frac{\left[r_w - \sqrt{r_w^2 - \left(\frac{b}{r_w \cdot 2 \cdot \cos(\beta_m - \delta_w)}\right)^2}\right] \cdot \tan \chi_1 \cdot \tan \alpha}{2 \cdot \cos \delta_w}$$

Notwithstanding the fact that the addendum surface and the root surface of the teeth, by virtue of such oblique position, are no longer parallel to one another, there are formed towards the tooth ends only negligibly small angle of attack error $\epsilon_{10}$.

This can be computed as follows: For the tooth centre:

$$\sin \epsilon_{10} = [\tan \delta_w \cdot \sin \epsilon_9 - \cos \chi(1 - \cos \epsilon_9)] \cdot \cos \delta_w \cdot \sin \chi_1 \quad \text{(XIII)}$$

$$\text{whereby } \sin \epsilon_9 = \frac{\sin \delta_w}{\cos \chi_1}$$

For the tooth outer edge there results $$\sin \epsilon_8 = [\tan \delta_w \cdot \sin \epsilon_7 - \cos \chi_1 \cdot (1 - \cos \epsilon_7)] \cdot \cos \delta_w \cdot \sin \chi_1 \quad \text{(XIV)}$$

wherein $\sin \epsilon_7 = \sin \dfrac{\delta_w - \beta_v}{\cos \chi_1}$ and $\sin \beta_v = \dfrac{b}{2 \cdot r_w \cdot \cos(\beta_m - \delta_w)}$ As to the tooth inner edge such can be computed from $$\sin \epsilon_{12} = [\tan \delta_w \cdot \sin \epsilon_{11} - \cos \chi_1(1 - \cos \epsilon_{11})] \cdot \delta_w \cdot \sin \chi_1 \quad \text{(XV)}$$

wherein $\dfrac{\sin(\delta_w + \beta_v)}{\cos \chi_1} = \sin \epsilon_{11}$

If the previously produced total crown $LB = LB_R - LB_{R'}$ corresponds to the originally predetermined value for LB, then the computation is therefore completed. The cutter head axis 11 is thus only pivoted in the vertical plane 27.

If the previously produced total crown does not correspond to the predetermined value for LB, then there must be accomplished a further crown amount $LB_N$. This value or magnitude $LB_N$ is obtained by inclining the cutter head axis 11 through an angle $\chi_2$.

From the total crown $$LB = LB_R - LB_{R'} + LB_N \quad \text{(XVI)}$$

there is obtained the desired value for $LB_N$ and from the Equation (XVII) it is possible to determine the angle $\chi_2$.

$$\tan \chi_2 = \frac{LB_N}{r_w - \sqrt{r_w^2 - \left(\dfrac{b}{r_w \cdot 2 \cdot \cos(\beta_m - \delta_w)}\right)^2}} \cdot \tan \alpha_n \quad \text{(XVII)}$$

The inclination of the cutter head axis 11 about the angle $\chi_2$ in the manner as explained in conjunction with the description of FIG. 3, causes a tooth twist. In order to be able to determine this tooth twist it is necessary to initially compute the following intermediate angle and magnitudes: From Equation (XVIII) the angle $\gamma_1$, $$\tan \gamma_1 = \frac{\tan \chi_1 \cdot \sin \delta_w \cdot \cos \epsilon_5}{\sin \epsilon_6} \quad \text{(XVIII)}$$

wherein, the angles $\epsilon_5$ and $\epsilon_6$ are not yet known. They can be derived from:

$$\tan \epsilon_5 = \tan \chi_1 \cdot \cos \delta_w$$

and $$\epsilon_6 = \epsilon_5 - \chi_2$$

The angle $\gamma_1$ is located between the cutter radius $r_w$ at the computation point 147 and the line 186 (FIG. 14) which is defined by a respective point 187 of the vertical 22 and a point 188 of the cutter head axis 11 in their position in the intersection line 29a according to FIG. 3. A straight line 189 through the point 188 and the point 190 of the intersection line 29 according to FIG. 3 is located in the plane 31 (FIG. 3). The points 188 and 189 are located in a not here illustrated parallel plane with respect to the tangential plane 14, which is known from the discussion of FIG. 3. In the flipped-over position or arrangement 191 about the straight line 189 the section or portion 154 of the cutter head axis 11 (FIG. 3) has been shown on a reduced scale. The straight line 192 corresponds to the position according to the intersection line 29, the straight line 193 to the position according to the section line 29a, and the straight line 194 to the normal 22 of FIG. 3. In this flipped-over position 191 there will be recognised the angles $\epsilon_5$, $\epsilon_6$ and $\chi_2$ in their projection at the plane 31 (FIG. 3).

A cutter head inclination angle $\chi'_2$ will be recognised in its actual size in a flipped-over arrangement 195 about the line 186. The line 196 corresponds therein to the plane of the cutter head radii $r_w$. A line 197 corresponds to a projection of the radius of curvature $r_k$ of the tooth lengthwise line 149 at the already mentioned plane of the cutter head radii $r_w$. There is valid:

$$\tan \chi'_2 = \tan \epsilon_6 / \cos \gamma_1 \quad \text{(XIX)}$$

The angle $\chi_4$, which appears in the flipped-over arrangement 195 between the line 196 and the line 198, which corresponds in plan view to the line 186, can be computed as follows:

$$\sin \chi_4 = (\cos \gamma_1 + \sin \delta_w \cdot \sin \epsilon_{14}) \cdot \sin \chi'_2 \quad \text{(XX)}$$

wherein $$\epsilon_{14} = \gamma_1 - \delta_w$$

Further, there are to be computed the following angles:

$\epsilon_2$ from $\sin \epsilon_2 = \sin \gamma_1 / \cos \chi_4$ $\epsilon_{15} = \gamma_1 - \beta_v$ $\epsilon_{16} = \gamma_1 + \beta_v$ $\epsilon_{17}$ from $\sin \epsilon_{17} = \sin \epsilon_{15} / \cos \chi_4$ $\epsilon_{18}$ from $\sin \epsilon_{18} = \sin \epsilon_{16} / \cos \chi_4$ $\epsilon_{19}$ from $\sin \epsilon_{19} = \sin \delta_w / \cos \chi_4$ $\epsilon_{20} = \epsilon_{17} - \epsilon_{19}$ $\epsilon_{21} = \epsilon_{18} - \epsilon_{19}$ These have been plotted in FIG. 14, especially in a flipped-over arrangement 199 about the line 196. These are only intermediate values which are computed such because otherwise there would have to be used an extremely complicated equation for the tooth twist.

Furthermore, there also must be computed auxiliary values $e_1$, $e_2$, $e_3$ and $e_4$.

$$e_1 = \tan \delta_w \left( \frac{\sin \epsilon_{14}}{\cos \chi'_2} - \sin \epsilon_{20} \right)$$

$$e_2 = \frac{\cos \chi_4 (\cos \epsilon_2 - \cos \epsilon_{17})}{\cos \delta_w}$$

$$e_3 = \frac{\cos \chi_4 (\cos \epsilon_2 - \cos \epsilon_{18})}{\cos \delta_w}$$

$$e_4 = \tan \delta_w \left( \frac{\sin \epsilon_{14}}{\cos \chi'_2} = \sin \epsilon_{21} \right)$$

From Equation (XXI) there can be derived the external twist angle $\epsilon_a$:

$$\sin \epsilon_a = (e_1 + e_2) \cdot \sin \chi'_2 \qquad \text{(XXI)}$$

From the Equation (XXII) there can be computed the internal twist angle $\epsilon_i$:

$$\sin \epsilon_i = (e_3 + e_4) \cdot \sin \chi'_2 \qquad \text{(XXII)}$$

The total tooth twist between both tooth ends therefore amounts to:

$$\epsilon_{10} = \epsilon_i - \epsilon_a \qquad \text{(XXIII)}$$

Upon loading a pair of teeth during practical operation the axes of the gears shift with respect to one another. Consequently, the load-bearing or load-carrying image is altered. However, in order to be able to bring about correct tooth load-carrying capabilities under load conditions, it can be desirable to produce during the fabrication of a pair of gears a certain tooth twist. This is so for the purpose of avoiding an undesired shifting of the load-supporting image under load conditions.

In the event that through inclination of the cutter head axis 11 through the angle $\chi_1$ or $\chi_1$ and $\chi_2$ there still has not yet been realised the desired twist $\epsilon_{20}$, then it is possible to further influence such in the case of generated tooth flanks by inclining with respect to one another the cutter head axis and the generating drum axis according to FIGS. 9 and 10. This produces a twist through the angle $\rho_a + \rho_i$.

The angle $\rho_a$, which corresponds to the twist at the external gear half, can be derived from the Equation (XXIV):

$$\sin \rho_a = \frac{a_2}{a_1} = \frac{b \cdot \tan (\beta_m - \delta_w) \cdot \sin \chi_3}{2 \cdot R_m} \qquad \text{(XXIV)}$$

wherein, $a_1 = \dfrac{R_m}{\sin \chi_3}$ and $$a_2 = \frac{b}{2} \cdot \tan(\beta_m - \delta_w)$$

The angle $\rho_i$, which corresponds to the twist at the internal gear half, can be computed in the same manner or can be approximately set equal to $\rho_a$. This is so in any event if, as happened above, instead of starting from the intersection points 202 and 203 of the cutter path with the internal and external boundaries of the crown gear 162, there is started with the intersection points 204 and 205 with the tangent 151 at the cutter path 150.

Starting from a non-twisted tooth there is realised at teeth 136 corrected in this manner a load-carrying image 135 as the same has been illustrated in FIG. 11. Its axis 137 extends diagonally over the tooth flank 138. Starting from twisted teeth there is reduced the diagonal position of the axis 137, so that there is formed the desired load-carrying image.

While there are shown and described present preferred embodiments of the invention, it is to be distinctly understood that the invention is not limited thereto, but may be otherwise variously embodied and practiced within the scope of the following claims. Accordingly,

What I claim is:

1. In a method of fabricating gears possessing lengthwise crowned teeth by cutting tooth flanks with a cutter head rotating about a cutter head axis and equipped with cutters possessing external cutting edges and internal cutting edges in a continuous gear-cutting operation, wherein the cutters at the cutter head are arranged such that pitch points of the external cutting edges are positioned at a first circle having a first radius and pitch points of the internal cutting edges are positioned at a second circle having a second radius different from the first radius and the external cutting edges are arranged such that each is displaced out of a uniform angular distribution by the amount of a first predetermined angle and the internal cutting edges are arranged such that each is displaced out of the uniform angular distribution by the amount of a second predetermined angle, the improvement comprising the steps of:

pivoting the cutter head axis out of a normal to a tangential plane taken through an operating pitch point of tooth lengthwise line of a pitch surface of a gear and within a vertical plane which is disposed substantially perpendicular to the tangential plane and extends at least approximately parallel to a radius of curvature of the tooth lengthwise line at the operating pitch point; and setting at the cutter head the external cutting edges and the internal cutting edges of the cutters such that, during use thereof and upon penetration through the operating pitch point, they each form a respective angle with a normal to the tangential plane, and said normal extending in non-parallel relationship to the cutter head axis.

2. The improvement as defined in claim 1, further including the step of:

machining both tooth flanks of a tooth gap of the gear during a single working operation.

3. The improvement as defined in claim 1, further including the steps of:

performing by means of the cutter head and the gear a generating movement about a generating drum axis relative to one another; and inclining a crown gear axis relative to the generating drum axis through a predetermined angle towards an operating pitch point.

4. The improvement as defined in claim 1 wherein:
said first radius is selected to be greater than said second radius in order to produce a positive tooth crown.

5. The improvement as defined in claim 4, wherein the step of pivoting the cutter head axis further includes the step of:
inclining the cutter head axis towards the pitch surface.

6. The improvement as defined in claim 1, further including the step of:
inducing gear tooth generating motions of the gear and the cutter relative to one another.

7. The improvement as defined in claim 5, wherein the step of pivoting the cutter head axis further includes the step of:
pivoting the cutter head axis into an inclined plane having in common with the vertical plane a line which is essentially parallel to the radius of curvature; and
said inclined plane being inclined through a predetermined angle with respect to the vertical plane.

8. The improvement as defined in claim 7, wherein:
said predetermined angle of inclination of said inclined plane amounts to ±5°.

9. The improvement as defined in claim 5, wherein the step of pivoting the cutter head axis further includes the step of:
inclining the cutter head axis within the vertical plane into a further plane having in common with a radial plane a connection line serving as a straight line of intersection with the tangential plane and thence into said inclined plane.

10. The improvement as defined in claim 9, wherein the step of pivoting the cutter head axis further includes the step of:
inclining the cutter head axis through a predetermined angle in the vertical plane into an intersection line with said further plane, pivoting the cutter head axis into the inclined plane through a predetermined angle and into an intersection line with said further plane, wherein the angle of inclination for the inclined plane is set in accordance with the predetermined angle of pivoting of said cutter head axis in said inclined plane.

11. In a method for fabricating gears with lengthwise crowned teeth by cutting tooth flanks in a continuous gear-cutting operation by means of a cutter head rotating about a cutter head axis and having cutter blades with external cutting edges as well as cutter blades with internal cutting edges, the cutter blades being arranged such that pitch points of the external cutting edges are disposed upon a first circle in a first uniform angular distribution and pitch points of the internal cutting edges are disposed upon a second circle in a second uniform angular distribution, the first circle having a different radius than the second circle and the first uniform angular distribution being angularly displaced from a predetermined reference uniform angular distribution by a first predetermined amount and the second uniform angular distribution being angularly displaced from the predetermined reference uniform angular distribution by a second predetermined amount, the improvement which comprises the steps of:
pivoting said cutter head axis out of a line within a first plane and about a point of intersection of said line with a second plane;
said line extending essentially perpendicular to said second plane;
said second plane extending essentially tangent to a pitch surface of the gear to be cut and including an operating pitch point of a tooth lengthwise line of the gear;
said first plane extending essentially perpendicular to said second plane and at least approximately parallel to a radius of curvature of said tooth lengthwise line at said operating pitch point;
setting said external cutting edges of said cutter blades of said cutter head such that each said external cutting edge forms a first angle with a normal line extending essentially perpendicular to said second plane when cutting at said operating pitch point;
setting said internal cutting edges of said cutter blades of said cutter head such that each said internal cutting edge forms a second angle with said normal line when cutting at said operating pitch point; and
said normal line extending in non-parallel relationship to said cutter head axis.

* * * * *

UNITED STATES PATENT AND TRADEMARK OFFICE
CERTIFICATE OF CORRECTION

PATENT NO. : 4,514,118
DATED : Apr. 30, 1985
INVENTOR(S) : Erich Kotthaus

It is certified that error appears in the above—identified patent and that said Letters Patent is hereby corrected as shown below:

Column 10, line 33, please delete "0"

Column 11, line 10, please delete "involuteshaped" and insert --involute-shaped--

Column 11, line 16, after "disclosed" please insert --apparatus and the method of the invention will be considered--

Column 15, line 36, after "·" (multiplication sign), second occurence, please insert --cos-- so that this portion of the equation will read $\cos \delta_w$ Signed and Sealed this Twenty-fourth Day of September 1985

[SEAL]

Attest:

Attesting Officer

DONALD J. QUIGG

Commissioner of Patents and Trademarks—Designate